United States Patent Office 3,536,633
Patented Oct. 27, 1970

3,536,633
PREPARATION OF HEAVY METAL
OXIDE-BASE CATALYST
Claude Falize and Georges Gobron, Melle, Deux-Sevres,
France, assignors to Melle-Bezons (Societe Anonyme),
Melle, Deux-Sevres, France
No Drawing. Continuation-in-part of application Ser. No.
494,957, Oct. 11, 1965. This application Oct. 22, 1968,
Ser. No. 769,744
Claims priority, application France, Nov. 2, 1967,
126,738
Int. Cl. B01j 11/82
U.S. Cl. 252—432          9 Claims

ABSTRACT OF THE DISCLOSURE

A process for preparing a catalyst which comprises dissolving oxides or acids of molybdenum, arsenic and boron in water without the addition of a solubilizing agent and then depositing the dissolved components on a catalyst carrier.

---

This is a continuation-in-part application of application Ser. No. 494,957, filed Oct. 11, 1965, now abandoned.

The present invention relates to a process for preparing a catalyst and more particularly to a process for preparing a heavy metal oxide-base catalyst useful in the oxidation of propylene.

Applicants' copending application relates to a process for oxidizing propylene in the presence of a heavy metal oxide-base catalyst to produce acetaldehyde, acrolein and formaldehyde with only slight losses of propylene in the form of carbon oxides and a low production of acetic acid, acetone and propionaldehyde. The process is characterized in that the oxide of the heavy metal, preferably molybdenum, there is added a promoter consisting essentially of a mixture of oxides of arsenic and boron so as to direct the oxidation reaction towards preferential production of acetaldehyde, acrolein and formaldehyde. Preferably, the catalyst is supported on a silica-containing carrier or alternatively a Carborundum or a pumice carrier.

The oxidation is carried out at 250°–450° C. and the pressure is preferably from 1 to 10 atmospheres (absolute). The starting gas mixture essentially comprises propylene, either pure or mixed with propane, air in excess, and water vapor. A single passage of the gas mixture over and through the catalyst causes conversion of 10 to 50% of the propylene, but it is preferred to limit the conversion rate to 10 to 30% and to recycle the residual gases. These gases, after being freed from aldehydes and acids by condensation, and after water washing, may be returned to the inlet of the oxidation zone with added oxygen.

The copending application describes two types of procedures for preparing the above-defined catalyst, namely, a molybdenum oxide dispersion procedure and a molybdenum oxide solubilization procedure.

In the first procedure, molybdenum oxide $MoO_3$ is dispersed throughout an aqueous solution of arsenic acid and boric acid, and silica is added to the dispersion to produce a paste which is then dried and calcined. In the second procedure, the three component elements, molybdenum, arsenic and boron are utilized in the form of ammonium salts of the acids derived from their respective oxides, by solubilizing these salts in an aqueous solution of ammonia. Silica is then added to the clear solution obtained, to produce a homogeneous paste. This paste is then dried and calcined, the calcination causing decomposition of the ammonium salts.

It should be also noted that for solubilizing the above-mentioned elements, the prior art has also recommended the use of nitric acid.

None of the above procedures, however, is fully satisfactory. The preparation using a molybdenum oxide dispersion give a catalyst of low homogeneity in which a large part of the element molybdenum remains foreign to the elements arsenic and boron. Preparation through solubilization in ammonia provides homogeneous pastes but it has been found that the subsequent drying and calcination of these pastes produces a heterogeneous solid catalyst, and the more ammonia the paste contains, the more heterogeneous is the resulting catalyst. Nitric acid solubilization suffers from similar inconveniences.

It is therefore an object of the present invention to provide a process for preparing a catalyst containing molybdenum oxide, arsenic oxide and boron oxide which overcomes the disadvantages of prior art processes.

In accordance with the present invention, catalysts are prepared by a solubilization process utilizing, besides the catalyst carrier, only oxides of molybdenum, arsenic and boron, or acids derived from such oxides, and water, without using a solubilizing agent or reactant such as ammonium ions, ammonia, or nitric acid. The dissolution can be performed simply by maintaining the component oxides or acids in boiling water until they are dissolved therein. In actual practice it is convenient to put the required proportions of the component oxides or acids in an amount of water suitable for their dissolution, then maintain the mixture at its boiling temperature, under reflux, until the dissolution is complete. A perfectly clear, blue solution is then obtained. The molybdenum oxide forms a water-soluble complex with the arsenic acid but this complex forms slowly, even in boiling water. It is for this reason that it was formerly believed the use of a solubilizing reactant was absolutely necessary to produce a clear solution.

After the solution is obtained, a paste may be prepared by addition of powdered silica, as in the known catalyst preparation through the solubilization procedure, with the addition of water if necessary. The total amount of water to be used in the preparation of the catalyst is preferably from 3 to 5 liters per kilogram of silica. After the drying and calcination steps there is obtained a catalyst which is much more homogeneous than the catalysts prepared with the aid of solublizing reactants. Furthermore, for an equal content of the elements molybdenum, arsenic and boron, the catalysts of the present invention have a higher activity, so that their use makes it possible either to carry out the catalytic conversion at a lower temperature to obtain an equal conversion rate, which condition favors a long active life of the catalyst, or alternatively, operating even at a high temperature, to increase the productivity of the catalyst.

The following non-limiting examples show how the process of the present invention for preparation of the catalyst may be carried out.

EXAMPLE 1

Into a glass balloon were introduced 1.5 liters of water, 82 grams of molybdenum oxide ($MoO_3$), 86 grams of ortho-arsenic acid ($AsO_4H_3 \cdot 1/2H_2O$), and 70.5 grams of boric acid ($BO_3H_3$). The mixture was boiled under reflux until the solids were completely dissolved, which operation required approximately 6 hours. The clear solution so obtained was cooled to room temperature and 1100 grams of commercial powdered silica and 3 liters of water were added to produce a gel. The gel was dried at a temperature of 100° C., ground and pelleted, and the pellets were calcined at a temperature in the range of 500° to 600° C. for 2 hours.

Another embodiment of the process of the present invention comprises impregnating a porous carrier, such as a sintered silica carrier, with the clear solution containing the molybdenum, arsenic and boron. In this embodiment it may be advantageous to prepare a solution much more concentrated than that illustrated in Example 1, e.g., substantially saturated solution. In such a case it may be advisable to carry out the impregnation at elevated temperatures, desirable at about 100° C., to avoid precipitation at lower temperatures, of boric acid.

EXAMPLE 2

The dissolution procedure of Example 1 was repeated with the exception that only 200 ml. of water were used which, in this case, is the minimum amount of water possible for dissolving the stated amounts of the component oxide and acids. A sintered silica carrier was impregnated with the resulting clear solution maintained at a temperature of about 100° C., and then dried and calcined.

It should be emphasized that in the embodiments of Examples 1 and 2, the lower the proportion of boric acid used, the lower is the amount of water necessary to dissolve the component oxides and acids.

A variation of the impregnation embodiment of Example 2 comprises performing the impregnation in two steps. First, the carrier is impregnated with a hot aqueous solution of boric acid, the solubility of which amounts to 40 grams in 100 ml. of water at 100° C. The so impregnated carrier is dried, then impregnated with a concentrated aqueous solution of arsenic-molybdic complex, the solubility of which in water, in the absence of boric acid is very high, even at low temperatures. This method permits utilizing arsenic-molybdic solutions much more concentrated than would be possible in the presence of dissolved boric acid.

EXAMPLE 3

A first solution was prepared by dissolving 70.5 grams boric acid in 300 ml. water at 80–85° C. A sintered silica carrier (800 grams) was impregnated with said solution at 80–85° C. and then dried at a temperature of 105–110° C. A second solution was prepared by dissolving 123 grams molybdenum oxide and 129 grams ortho-arsenic acid in 700 ml. water held at the boiling temperature, under reflux, until the solids were completely dissolved. The solution was then concentrated to 300 ml. without any crystallization occuring therein, even when cooled. The boric acid containing carrier was impregnated with the second solution at room temperature, and then dried and calcined.

The temperature for depositing oxides in the impregnation embodiments is preferably between 20° and 100° C. The catalyst mass is then dried at, for example, 100° C. for several hours, e.g., 20 hours, and then activated by heating to between 300° and 550° C. in air for 1 to 3 hours. The activated mass is ground and sifted to obtain grains of 1–5 mm. for use in a static catalyst bed or smaller grains for use in a fluidized catalyst bed.

The following examples show comparative propylene oxidation operations using catalysts of the prior art and of the present invention.

EXAMPLE 4

The oxidation operations were carried out in a heated stainless steel reaction tube containing 2 liters of catalyst, and fed with a gaseous mixture of propylene, air and nitrogen. The nitrogen was used to further dilute the oxygen contained in the air. The operating temperature was measured in the body of the catalytic mass near the outlet of the tube.

Two comparative experiments were carried out, one utilizing catalyst (I) prepared with the help of ammonia as a solubilizing reactant, and the other utilizing catalyst (II) prepared in accordance with the procedure as described in Example 1. The two catalysts contained identical proportions of molybdenum, arsenic and boron.

In each experiment the reaction tube was fed with the following amounts of gases:

| | Liters per hour |
|---|---|
| Propylene | 225 |
| Air | 900 |
| Nitrogen | 540 |

After 60 hours, the results were as follows:

| | Catalyst I | Catalyst II |
|---|---|---|
| Temperature, ° C | 490 | 460 |
| Molar conversion into oxygen-containing organic products, percent | 10 | 14 |
| Molar yield of oxygen-containing organic products, percent | 71 | 74 |
| Productivity of the reaction tube, moles per hour | 0.65 | 1 |

With catalyst I, 71 moles of propylene were converted into the following yields of oxygen-containing organic products:

| | Moles |
|---|---|
| Acrolein | 35 |
| Acetaldehyde | 27 |
| Propionaldehyde | 2.7 |
| Acetone | 1.9 |
| Acetic and acrylic acids | 3.4 |
| Formaldehyde | 33 |

With catalyst II, 74 moles of propylene were converted as follows:

| | Moles |
|---|---|
| Acrolein | 37 |
| Acetaldehyde | 28 |
| Propionaldehyde | 2.6 |
| Acetone | 1.9 |
| Acetic and acrylic acids | 3 |
| Formaldehyde | 35 |

EXAMPLE 5

The comparative experiments of Example 4 were repeated, except that the reaction tube was fed with the following amounts of gases:

| | Liters per hour |
|---|---|
| Propylene | 375 |
| Air | 1500 |
| Nitrogen | 900 |

The two experiments were carried out at the same temperature.

After 60 hours, the results were as follows:

| | Catalyst I | Catalyst II |
|---|---|---|
| Temperature, ° C | 490 | 490 |
| Molar conversion into oxygen-containing organic products, percent | 8 | 20 |
| Molar yields of oxygen-containing organic products, percent | 73 | 70 |
| Productivity of the reaction tube, moles per hour | 0.86 | 2.1 |

With catalyst I, 73 moles of propylene were converted into the following yields of oxygen-containing organic products:

| | Moles |
|---|---|
| Acrolein | 35.4 |
| Acetaldehyde | 28.2 |
| Propionaldehyde | 2.6 |
| Acetone | 1.9 |
| Acetic and acrylic acids | 3.9 |
| Formaldehyde | 34.3 |

With catalyst II, 70 moles of propylene were converted as follows:

| | Moles |
|---|---|
| Acrolein | 37.7 |
| Acetaldehyde | 25 |
| Propionaldehyde | 2.5 |
| Acetone | 2 |
| Acetic and acrylic acids | 3.8 |
| Formaldehyde | 31.2 |

The catalysts of the present invention may contain from 10 to 80% metal oxides and from 90 to 20% carrier such as silica. The molar proportion of boron with respect to each of arsenic and molybdenum is from 0.2 to 5 and preferably from 0.5 to 2. The molar proportion of arsenic to molybdenum is also from 0.2 to 5, preferably from 0.5 to 2, more especially about 1.

What is claimed is:

1. An improvement in the process for preparing a catalyst containing molybdenum oxide, arsenic oxide and boron oxide and impregnating the catalyst on a carrier, said improvement comprising solubilizing the component oxides by maintaining the oxides or corresponding acids of molybdenum, arsenic and boron in boiling water, said oxides or acids being dissolved without the addition of a solubilizing agent.

2. The improvement of claim 1 wherein the dissolution is conducted under reflux.

3. The improvement of claim 1 or 2 which further comprises forming a paste or gel by adding powdered silica to the aqueous solution of the oxides or acids, and preparing the final catalyst from said paste or gel.

4. The improvement of claim 3 wherein the total amount of water employed is from 3 to 5 liters per kilogram of silica.

5. The improvement of claim 1 which further comprises impregnating a porous carrier with the aqueous solution of the oxides or acids, then drying and calcining the impregnated carrier.

6. The improvement of claim 5 wherein a highly concentrated solution of the oxides or acids is employed.

7. The improvement of claim 6 wherein the impregnation step of the porous carrier is carried out at a temperature of about 100° C.

8. The improvement of claim 1 or 2 which further comprises impregnating a porous carrier with a hot aqueous solution of boric acid, drying the impregnated carrier, then impregnating the carrier with a concentrated aqueous solution of arsenic acid and molybdenum oxide and finally drying and calcining the catalyst so prepared.

9. A catalyst prepared in accordance with claim 1.

References Cited

UNITED STATES PATENTS

| | | | |
|---|---|---|---|
| 2,562,989 | 8/1951 | Naragon | 252—432 XR |
| 3,293,280 | 12/1966 | Young et al. | 252—432 XR |
| 3,386,923 | 6/1968 | Young et al. | 252—432 |

PATRICK P. GARVIN, Primary Examiner

U.S. Cl. X.R.

260—604